Oct. 14, 1958     M. L. FALLON     2,855,806
DIFFERENTIAL TRANSMISSION MECHANISM
Filed Sept. 30, 1957     2 Sheets-Sheet 2

United States Patent Office 2,855,806
Patented Oct. 14, 1958

2,855,806

DIFFERENTIAL TRANSMISSION MECHANISM

Michael L. Fallon, Rochester, N. Y., assignor to The Gleason Works, Rochester, N. Y., a corporation of New York Application September 30, 1957, Serial No. 687,029

4 Claims. (Cl. 74—711)

The present invention relates to a differential transmission mechanism, particularly for use in an automotive axle drive, of the type which provides a substantial driving torque to both axle shafts even when one of the driving wheels has little traction.

The primary object of the invention is a mechanism of this kind which will be effective for the purpose indicated and yet will be simple, inexpensive and rugged, and which will also be very compact so as to require no increase in the dimensions of its housing.

A differential mechanism according to the invention comprises a case, a pair of bevel side gears rotatable within the case, a spider disposed between the side gears and rotatably supporting at least one bevel pinion in meshing engagement with both side gears, a coupling member non-rotatable in the case but movable axially therein, said coupling member being disposed between one side gear and the spider and having face coupling teeth mating with coupling teeth on the spider, said teeth being of positive pressure angle whereby drive torque transmitted through them urges relative axial displacement of the coupling member and the spider, and the side gears having front and back bearing faces respectively for receiving axial thrust loads resulting from such displacement and for transmitting such loads to the case.

Preferably, there are two co-axial bevel pinions meshing with both side gears, and said coupling member is disposed between the two pinions and is supported for axial motion in two diametrically opposed recesses in the case; and the back faces of the pinions are external spherical surfaces seated in complementary spherical recesses formed in the case, with their sphere centers lying on the axis of rotation of the case, for permitting relative motion between the pinions and the case about said axis of rotation.

The foregoing and other objects and advantages will appear from the following description of the preferred embodiment of the invention shown in the accompanying drawings, wherein.

Figure 1:
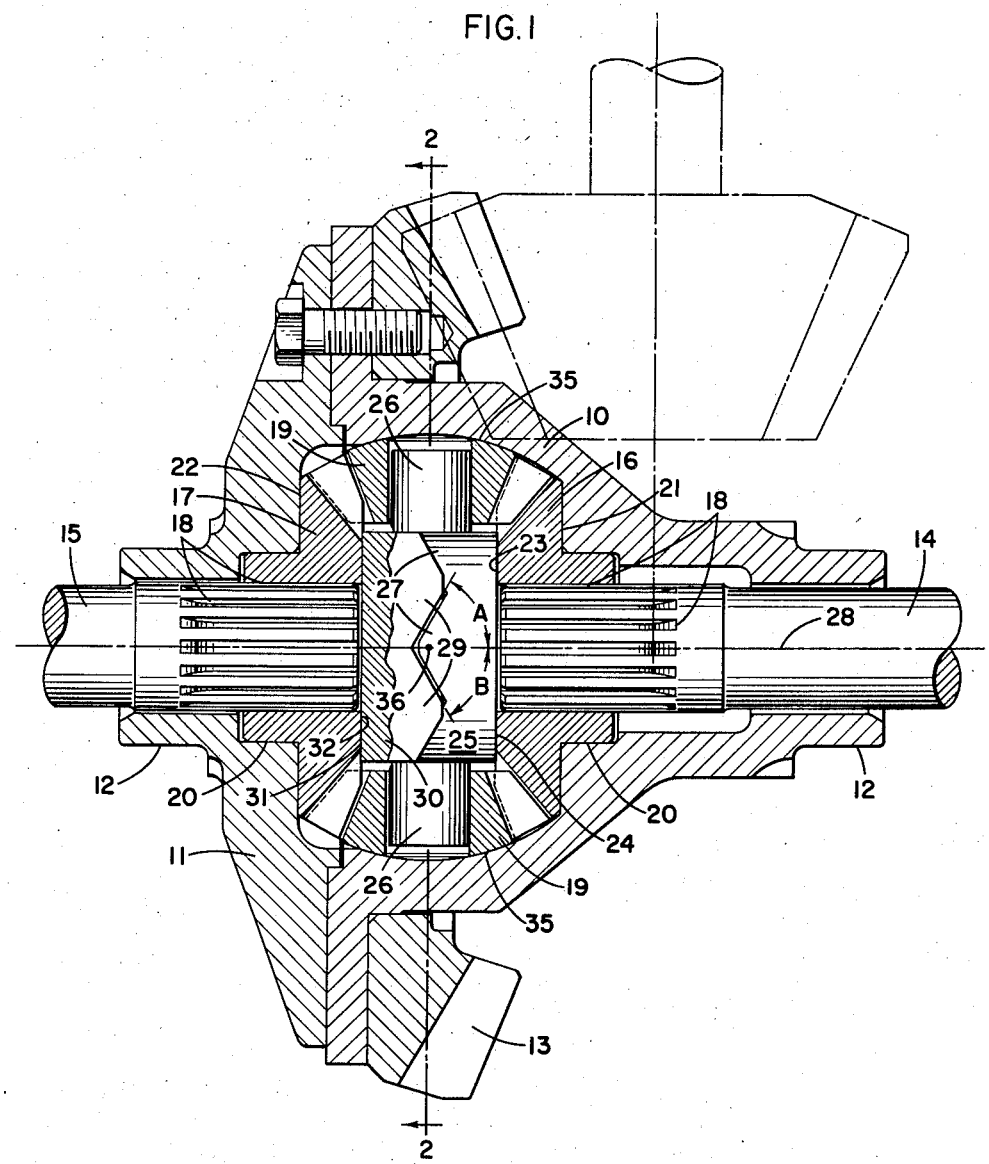
Fig. 1 is a section in a plane containing the axis of rotation of the differential and axle shaft assembly.

The differential mechanism includes a case comprising a body 10 having secured thereto a cover 11. On these parts are trunnions 12 on which the case is journaled on suitable bearings, not shown, for rotation in a suitable axle housing. A ring gear 13 secured to the case is adapted to mesh with a suitable drive pinion. The trunnions have central bores through which extend the axle shafts, designated 14 and 15. The differential gears consist of bevel side gears 16 and 17 having splined connections 18 to the axle shafts, and two pinions 19 each of which meshes with both side gears.

The side gears 16 and 17 have back hubs 20 rotatable in counterbores in the case and have plane back faces, respectively 21 and 22, in bearing contact with opposite plane inside faces of the case. The front face 23 of gear 16 has bearing contact with a plane face 24 of spider 25. The spider has trunnions 26 on which the pinions 19 are journaled for rotation. The side of the spider opposite to face 24 thereof is provided with tapered face coupling teeth 27, these teeth being radial of, and tapering outwardly from, the axis of rotation 28 of the differential and axle shaft assembly.

Figure 2:
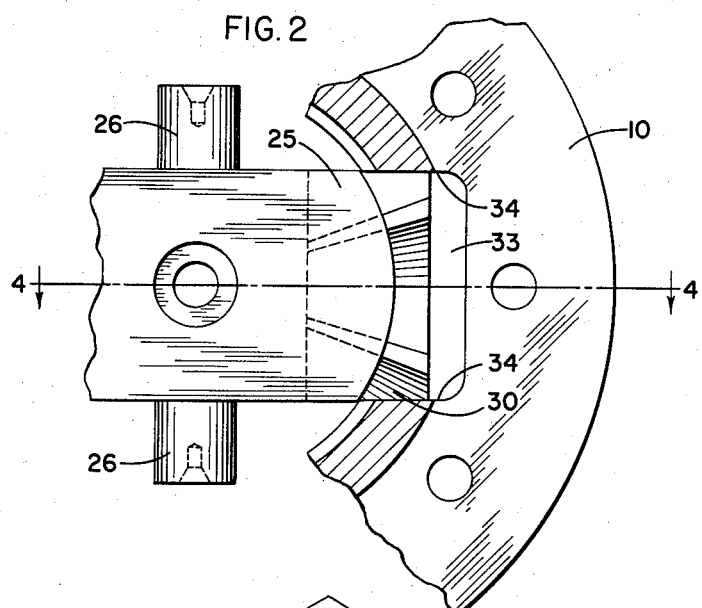
Fig. 2 is a fragmentary section in the plane designated 2—2 in Figs. 1 and 4, but with the spider and coupling member appearing in elevation.
Figure 3:
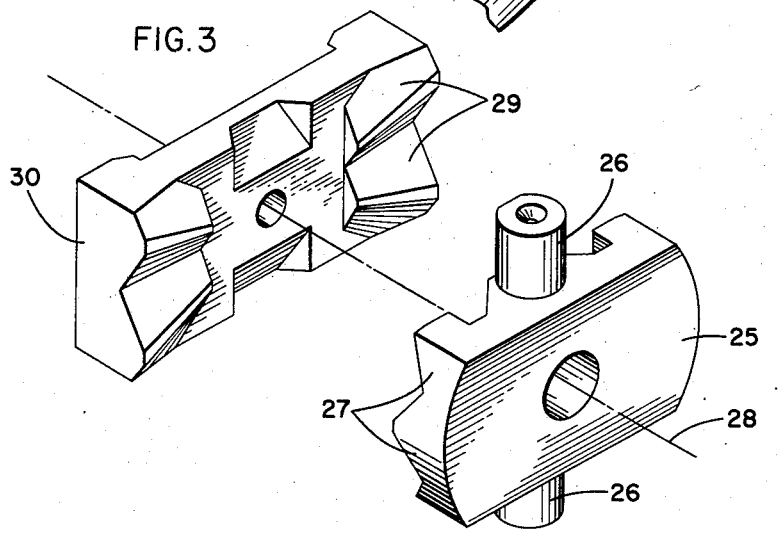
Fig. 3 is an isometric view of the spider and coupling member.
Figure 4:
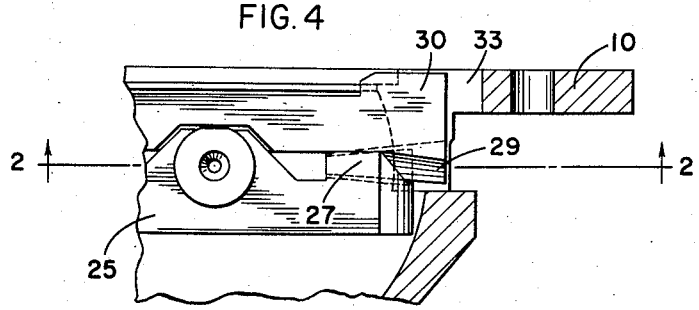
Fig. 4 is a fragmentary section in the plane 4—4 of Fig. 2, and also showing the spider and coupling member in elevation.

Teeth 27 mate with complementary teeth 29 on one face of a coupling member 30 whose opposite face, 31, is plane and has bearing contact with the plane front face 32 of side gear 17. The coupling member is disposed between the two pinions 19 and has its opposite ends received in two diametrically opposed recesses in the case body 10. One of these recesses is shown at 33 in Figs. 2 and 4. The surfaces 34 of these recesses, through which torque is exerted between the coupling member and the case, extend parallel to axis 28 so the coupling member is free for limited motion relative to the case along that axis. Because of the inherent self-centering action of coupling members of the configuration shown when subjected to an axial compressive load, no means for holding the member 30 against motion in a direction perpendicular to the axis of the pinions, i. e. horizontally in Fig. 2, is provided in this particular embodiment of the invention.

The pinions 19 have spherical back faces 35 seating in complementary spherical recesses in case body 10. The sphere center of these recesses is at the juncture 36 of axis 28 with the axis of trunnions 26, whereby the pinions may have limited motion relative to the case about axis 28. Due to slight clearance between the bores of the pinions and the trunnions 26 the spider may also have a minute motion along axis 28.

In operation the present mechanism differentiates in the conventional manner to divide between the two axle shafts 14 and 15 the drive torque applied to the case, and to allow one shaft to overrun the case and the other to underrun it when the vehicle is turning. However the drive torque between the case and the axle shafts (or the coast torque between the shafts and the case) is transmitted through coupling teeth 27, 29, and because of the positive pressure angles of these teeth, which angles for opposite sides of the teeth are designated A and B in Fig. 1, such torque tends to cam the spider and the coupling member apart. This tendency results in axial thrust loads which are transmitted from the spider through side gear 16 against one inside face of the case and from the coupling member through side gear 17 against the opposite inside face of the case. The resulting friction between the back faces of the side gears and the case, and between the front faces of the gears and the coupling member and spider, resists differential action and results in the application of a driving torque to both axle shafts, even when the vehicle wheel connected to one shaft is on a slippery surface or is bouncing on a rough surface and hence has little or intermittent traction. As a result the vehicle is better able to cope with adverse road conditions. When the vehicle is turning the driving torque is usually reduced and hence there is little if any interference with the differential action then needed.

It will be understood that the present mechanism is of rugged and simple construction, and that the parts additional to those found in a conventional differential are disposed within the space between the side gears and the pinions so that they require no increase in the outside dimensions of the case. Because of this compactness, no change whatever of the axle housing is required to apply the present invention. The magnitude of the frictional resistance to differential action produced by the coupling teeth may be varied to suit any particular vehicle by increasing or decreasing one or both the pressure angles A and B, and also by changing the material from which are made the several parts that have frictional engagement. For a conventional passenger car of medium size, satisfactory performance is obtained by making both of these angles on the order of sixty degrees when the parts 10, 11, 16, 17, 25 and 30 are all of steel, the exact angle not being critical. The magnitude of the frictional resistance may also be varied in other ways, as for example by the insertion, between the frictionally-engaging surface, of washers or shoes which have a higher or lower co-efficient of friction.

Having now described the preferred embodiment of my invention and its operation, what I claim is:

1. A differential mechanism comprising a case, a pair of bevel side gears rotatable within the case, a spider disposed between the side gears and rotatably supporting at least one bevel pinion in meshing engagement with both side gears, a coupling member non-rotatable in the case but movable axially therein, said coupling member being disposed between one side gear and the spider and having face coupling teeth mating with coupling teeth on the spider, said teeth being of positive pressure angle whereby drive torque transmitted through them urges relative axial displacement of the coupling member and the spider, and the side gears having front and back bearing faces respectively for receiving axial thrust loads resulting from such displacement and for transmitting such loads to the case.

2. A differential mechanism according to claim 1 in which there are two co-axial bevel pinions meshing with both side gears, and said coupling member is disposed between the pinions and is supported for axial motion in two diametrically opposed recesses in the case.

3. A differential mechanism according to claim 2 in which the back faces of the pinions are spherical surfaces seated in complementary spherical recesses formed in the case, with their sphere centers lying on the axis of rotation of the case, for permitting relative motion between the pinions and the case about said axis of rotation.

4. A differential mechanism according to claim 2 in which said coupling teeth extend substantially radially from the axis of rotation of the case and side gears, whereby in the presence of torque loads of said teeth act to center the coupling member with respect to the spider in a direction perpendicular to the axis of the pinions.

References Cited in the file of this patent
UNITED STATES PATENTS

| | | |
|---|---|---|
| 1,586,861 | Taylor | June 1, 1926 |
| 2,624,216 | Nielsen | Jan. 6, 1953 |
| 2,720,796 | Schou | Oct. 18, 1955 |